United States Patent
Jain et al.

(10) Patent No.: US 7,627,547 B2
(45) Date of Patent: Dec. 1, 2009

(54) PROCESSING PATH-BASED DATABASE OPERATIONS

(75) Inventors: Namit Jain, San Jose, CA (US); Fei Ge, Palo Alto, CA (US); Ravi Murthy, Fremont, CA (US); Subramanian Muralidhar, Seattle, WA (US); Nipun Agarwal, Santa Clara, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 264 days.

(21) Appl. No.: 10/999,864

(22) Filed: Nov. 29, 2004

(65) Prior Publication Data

US 2006/0117049 A1 Jun. 1, 2006

(51) Int. Cl.
*G06F 7/00* (2006.01)
(52) U.S. Cl. .......................................... 707/1
(58) Field of Classification Search ................. 707/100, 707/205, 1, 2, 3, 4, 104.1; 709/201, 217, 709/218, 229
See application file for complete search history.

(56) References Cited

U.S. PATENT DOCUMENTS

| | | | |
|---|---|---|---|
| 5,047,918 | A | 9/1991 | Schwartz et al. |
| 5,151,989 | A | 9/1992 | Johnson et al. |
| 5,202,982 | A | 4/1993 | Gramlich et al. |
| 5,210,686 | A | 5/1993 | Jernigan |
| 5,257,366 | A | 10/1993 | Adair et al. |
| 5,295,256 | A | 3/1994 | Bapat |
| 5,307,490 | A | 4/1994 | Davidson et al. |
| 5,369,763 | A | 11/1994 | Biles |
| 5,379,422 | A * | 1/1995 | Antoshenkov ............... 707/1 |

(Continued)

FOREIGN PATENT DOCUMENTS

EP 856803 A2 8/1998

(Continued)

OTHER PUBLICATIONS

Arthur et al., UNIX Shell Programming, 4th edition, John Wiley & Sons, Inc., 1997, pp. 77, 103, and 104.*

(Continued)

*Primary Examiner*—Cheyne D Ly
(74) *Attorney, Agent, or Firm*—Hickman Palermo Truong & Becker LLP; Christian A. Nicholes (57) ABSTRACT

A method and apparatus for processing path-based database operations is provided. According to one aspect, a "parent row ID" column is added to a directory links table. For each row in the table, the value of the "parent row ID" column indicates the row ID, in the table, of the node that is that row's node's parent in the file hierarchy. To determine whether a particular node is within a specified path of the file hierarchy, the particular node's pathname is derived by visiting child-to-parent links indicated in the table and prepending, to the front of a pathname being constructed for the particular node, node names indicated in the visited rows. Each parent node's row in the directory links table is located using the "parent row ID" column of the child node's row. The resulting pathname is compared with the specified path to determine whether the particular node exists therein.

18 Claims, 7 Drawing Sheets

U.S. PATENT DOCUMENTS

| | | | |
|---|---|---|---|
| 5,388,257 A | 2/1995 | Bauer | |
| 5,390,318 A | 2/1995 | Ramakrishnan et al. | |
| 5,410,691 A | 4/1995 | Taylor | |
| 5,437,029 A | 7/1995 | Sinha | |
| 5,454,101 A | 9/1995 | Mackay et al. | |
| 5,463,772 A | 10/1995 | Thompson et al. | |
| 5,467,471 A | 11/1995 | Bader | |
| 5,499,371 A | 3/1996 | Henninger et al. | |
| 5,504,892 A | 4/1996 | Atsatt et al. | |
| 5,524,240 A | 6/1996 | Barbara et al. | |
| 5,530,849 A | 6/1996 | Hanushevsky et al. | |
| 5,544,360 A | 8/1996 | Lewak et al. | |
| 5,546,571 A | 8/1996 | Shan et al. | |
| 5,561,763 A | 10/1996 | Eto et al. | |
| 5,566,328 A * | 10/1996 | Eastep | 707/102 |
| 5,566,331 A | 10/1996 | Irwin, Jr. et al. | |
| 5,568,640 A | 10/1996 | Nishiyama et al. | |
| 5,574,915 A | 11/1996 | Lemon et al. | |
| 5,680,614 A | 10/1997 | Bakuya et al. | |
| 5,682,524 A | 10/1997 | Freund et al. | |
| 5,684,990 A | 11/1997 | Boothby | |
| 5,689,706 A | 11/1997 | Rao et al. | |
| 5,701,467 A | 12/1997 | Freeston | |
| 5,737,736 A | 4/1998 | Chang et al. | |
| 5,758,153 A | 5/1998 | Atsatt et al. | |
| 5,778,179 A | 7/1998 | Kanai et al. | |
| 5,802,518 A | 9/1998 | Karaev et al. | |
| 5,819,275 A | 10/1998 | Badger et al. | |
| 5,822,511 A | 10/1998 | Kashyap et al. | |
| 5,825,353 A | 10/1998 | Will | |
| 5,832,526 A | 11/1998 | Schuyler | |
| 5,838,965 A | 11/1998 | Kavanagh et al. | |
| 5,842,212 A | 11/1998 | Ballurio et al. | |
| 5,842,214 A * | 11/1998 | Whitney et al. | 707/10 |
| 5,848,246 A | 12/1998 | Gish | |
| 5,864,870 A | 1/1999 | Guck | |
| 5,878,415 A | 3/1999 | Olds | |
| 5,878,434 A | 3/1999 | Draper et al. | |
| 5,892,535 A | 4/1999 | Allen et al. | |
| 5,915,253 A | 6/1999 | Christiansen | |
| 5,917,492 A | 6/1999 | Bereiter | |
| 5,918,225 A | 6/1999 | White et al. | |
| 5,921,582 A | 7/1999 | Gusack | |
| 5,937,406 A | 8/1999 | Balabine et al. | |
| 5,956,506 A | 9/1999 | Cobb et al. | |
| 5,974,407 A | 10/1999 | Sacks | |
| 5,978,791 A | 11/1999 | Farber et al. | |
| 5,991,771 A | 11/1999 | Falls et al. | |
| 6,008,806 A | 12/1999 | Nakajima et al. | |
| 6,021,414 A | 2/2000 | Fuller | |
| 6,023,706 A | 2/2000 | Schmuck et al. | |
| 6,026,402 A | 2/2000 | Vossen et al. | |
| 6,029,160 A | 2/2000 | Cabrera et al. | |
| 6,029,162 A * | 2/2000 | Schultz | 707/2 |
| 6,029,166 A | 2/2000 | Mutalik et al. | |
| 6,029,175 A | 2/2000 | Chow et al. | |
| 6,052,122 A | 4/2000 | Sutcliffe et al. | |
| 6,055,527 A | 4/2000 | Badger et al. | |
| 6,088,694 A | 7/2000 | Burns et al. | |
| 6,092,086 A | 7/2000 | Martin et al. | |
| 6,101,500 A | 8/2000 | Lau | |
| 6,111,578 A | 8/2000 | Tesler | |
| 6,112,209 A | 8/2000 | Gusack | |
| 6,115,741 A | 9/2000 | Domenikos et al. | |
| 6,119,118 A | 9/2000 | Kain, III et al. | |
| 6,128,610 A | 10/2000 | Srinivasan et al. | |
| 6,182,121 B1 | 1/2001 | Wlaschin | |
| 6,185,574 B1 | 2/2001 | Howard et al. | |
| 6,192,273 B1 | 2/2001 | Igel et al. | |
| 6,192,373 B1 | 2/2001 | Haegele | |
| 6,208,993 B1 | 3/2001 | Shadmon | |
| 6,212,512 B1 | 4/2001 | Barney et al. | |
| 6,212,557 B1 | 4/2001 | Oran | |
| 6,230,310 B1 | 5/2001 | Arrouye et al. | |
| 6,233,729 B1 | 5/2001 | Campara et al. | |
| 6,236,988 B1 | 5/2001 | Aldred | |
| 6,236,991 B1 | 5/2001 | Frauenhofer et al. | |
| 6,247,024 B1 | 6/2001 | Kincaid | |
| 6,279,005 B1 | 8/2001 | Zellweger | |
| 6,279,007 B1 | 8/2001 | Uppala | |
| 6,301,605 B1 | 10/2001 | Napolitano et al. | |
| 6,314,408 B1 | 11/2001 | Salas et al. | |
| 6,321,219 B1 | 11/2001 | Gainer et al. | |
| 6,339,382 B1 | 1/2002 | Arbinger et al. | |
| 6,349,295 B1 | 2/2002 | Tedesco et al. | |
| 6,366,921 B1 | 4/2002 | Hansen et al. | |
| 6,366,988 B1 | 4/2002 | Skiba et al. | |
| 6,370,537 B1 | 4/2002 | Gilbert et al. | |
| 6,370,548 B1 | 4/2002 | Bauer et al. | |
| 6,389,427 B1 | 5/2002 | Faulkner | |
| 6,389,433 B1 | 5/2002 | Bolosky et al. | |
| 6,393,435 B1 | 5/2002 | Gartner et al. | |
| 6,397,231 B1 | 5/2002 | Salisbury et al. | |
| 6,421,692 B1 | 7/2002 | Milne et al. | |
| 6,427,123 B1 * | 7/2002 | Sedlar | 702/2 |
| 6,430,575 B1 | 8/2002 | Dourish et al. | |
| 6,438,550 B1 | 8/2002 | Doyle et al. | |
| 6,442,548 B1 | 8/2002 | Balabine et al. | |
| 6,446,091 B1 | 9/2002 | Noren et al. | |
| 6,457,065 B1 | 9/2002 | Rich et al. | |
| 6,470,345 B1 * | 10/2002 | Doutre et al. | 707/100 |
| 6,535,970 B1 | 3/2003 | Bills et al. | |
| 6,549,916 B1 * | 4/2003 | Sedlar | 707/200 |
| 6,594,675 B1 | 7/2003 | Schneider | |
| 6,604,100 B1 | 8/2003 | Fernandez et al. | |
| 6,611,843 B1 | 8/2003 | Jacobs | |
| 6,636,845 B2 | 10/2003 | Chau et al. | |
| 6,681,221 B1 | 1/2004 | Jacobs | |
| 6,711,595 B1 | 3/2004 | Anantharao | |
| 6,725,212 B2 | 4/2004 | Couch et al. | |
| 6,725,227 B1 | 4/2004 | Li | |
| 6,889,223 B2 | 5/2005 | Hattori | |
| 6,965,903 B1 * | 11/2005 | Agarwal et al. | 707/104.1 |
| 6,970,975 B2 | 11/2005 | Frank | |
| 7,031,956 B1 | 4/2006 | Lee et al. | |
| 7,171,407 B2 | 1/2007 | Barton et al. | |
| 7,359,934 B1 | 4/2008 | Ricart et al. | |
| 2001/0054042 A1 | 12/2001 | Watkins et al. | |
| 2002/0056025 A1 | 5/2002 | Qiu et al. | |
| 2002/0120858 A1 | 8/2002 | Porter et al. | |
| 2002/0133484 A1 | 9/2002 | Chau et al. | |
| 2002/0184401 A1 | 12/2002 | Kadel, Jr. et al. | |
| 2003/0004937 A1 | 1/2003 | Salmenkaita et al. | |
| 2003/0033285 A1 | 2/2003 | Jalali et al. | |
| 2003/0065659 A1 | 4/2003 | Agarwal et al. | |
| 2003/0084056 A1 | 5/2003 | DeAnna et al. | |
| 2003/0101194 A1 | 5/2003 | Rys et al. | |
| 2003/0195865 A1 | 10/2003 | Long et al. | |
| 2003/0200197 A1 | 10/2003 | Long et al. | |
| 2003/0212662 A1 | 11/2003 | Shin et al. | |
| 2004/0043758 A1 | 3/2004 | Sorvari et al. | |
| 2004/0064466 A1 | 4/2004 | Manikutty et al. | |
| 2004/0103282 A1 | 5/2004 | Meier et al. | |
| 2004/0148278 A1 | 7/2004 | Milo et al. | |
| 2004/0176958 A1 | 9/2004 | Salmenkaita et al. | |
| 2004/0225680 A1 | 11/2004 | Cameron et al. | |
| 2004/0267760 A1 | 12/2004 | Brundage et al. | |
| 2005/0228786 A1 | 10/2005 | Murthy et al. | |
| 2005/0228792 A1 | 10/2005 | Chandrasekaran et al. | |
| 2005/0229158 A1 | 10/2005 | Thusoo et al. | |
| 2006/0074925 A1 | 4/2006 | Bixby et al. | |

| | | | |
|---|---|---|---|
| 2007/0118561 | A1 | 5/2007 | Idicula et al. |

FOREIGN PATENT DOCUMENTS

| | | |
|---|---|---|
| WO | WO 97/46956 A1 | 12/1997 |
| WO | WO 00/14632 A1 | 3/2000 |
| WO | WO 00/49533 A2 | 8/2000 |
| WO | WO 01/42881 A2 | 6/2001 |
| WO | WO 01/59602 A1 | 8/2001 |
| WO | WO 01/61566 A1 | 8/2001 |
| WO | WO 03/027908 A2 | 4/2003 |

OTHER PUBLICATIONS

European Patent Office, "Communication Pursuant to Article 96(2) EPC," App. No. 00952215.2, dated Oct. 5, 2006, received on Oct. 13, 2006, 7 pages.

Amended Claims, EP App. 00952215.2, 26 pages.

Al-Khalifa, S. et al., "Structural Joins: A Primitive for Efficient XML Query Pattern Matching", Feb. 26-Mar. 1, 2002, Data Engineering, 2002. Proceedings. 18th International Conference, pp. 141-152.

Bouret, R., et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

Brage, Daniele et al., "A Graphical Environment to Query XML Data with Query," Proceedings of the Fourth International Conference on Web Information Systems Engineering (WISE '03), 2003, IEEE, 10 pages.

Chae, Mi-Ok, et al., "Design and Implementation of an Object-Oriented Multimedia DBMS Tightly Coupled with Information Retrieval Functions,"Proc. 17th IASTED International Conference on Applied Informatics, Feb. 15-18, 1999, abstract.

Chakraborty, Krishnendu, "The XML Garbage Collector", The Source for Developers, Sun Developer Network Site XP-002297849, Mar. 2002.

Chen, Ruey-Shun et al., "Developing an XML framework for metadata system", Trinity College Dublin, Proc. of the 1st Inter. Sympo. on Information and Communication, pp. 267-272.

Cheng, Josephine, et al., "IBM DB2 XML Extender," IEEE, ICDE '00 Conference, San Diego, Feb. 2000, 128 pages.

Jajodia, Sushil et al., "Toward a Multilevel Secure Relational Data Model," ACM, 1991, 8393 SIGMOD Record, Jun. 20, 1991, No. 2, New York, US, XP 000364619, pp. 50-59.

Manolescu, Dragos, Review of "Metadata solutions: using metamodels, repositories, XML, and enterprise portals to generate information on demand by Adrienne Tannebaum", Mar. 2003, ACM Press, vol. 28, Issue 2, page 38.

Noser, Hansrudi, et al., "Dynamic 3D Visualization of Database-Defined Tree Structures on the WWW by Using Rewriting Systems," 2000, IEEE, XP- 002262516, pp. 247-254.

Oracle, "Oracle iFS (Internet File System)," Mar. 1999, XP-002204710, 3 pages.

Rao, Herman Chung-Hwa, et al., "An Overview of the Internet File System," 1997, IEEE, XP-002204711, pp. 474-477.

Ricardo, Catherine, "Database Systems: Principles, Design, & Implementation," 1990, MacMillian Publishing Co., pp. 357-361, 379-380.

Vorthmann, S., et al. "Beyond Schemas, Schema Adjuncts and the Outside World," Markup Languages, Online!, vol. 2, No. 3, Jun. 2000, pp. 1-8.

Written Opinion, Application No. PCT/US03/35551 (8 pages).

McHugh, Jason et al., "Query Optimization for XML", XP-002333353, *Proceedings of the 25th VLDB Conference* (1999) pp. 315-326.

Yoshikawa, Masatoshi et al., "XRel: A Path-Based Approach to Storage and Retrieval of XML Documents Using Relational Databases", XP-001143686, *ACM Transactions on Internet Technology* (2001), pp. 110-141.

Cooper, Brian F. et al., "A Fast Index for Semistructured Data ," Proceeding of the International Conference on Very Large Databases, 2001, XP-002303292, pp. 341-350.

McHugh, Jason, et al. "Indexing Semistructured Data," Stanford Science Department, 1998, XP-002248313, pp. 1-21.

European Patent Office, "Communication Pursuant to Article 96(2) EPC," EP App. No. 02799692.5, dated Jan. 18, 2006, 5 pages.

Current Claims PCT/US02/31168, EP App. No. 02799692.5, 8 pages.

\* cited by examiner

Fig. 1

FILES TABLE 210

| Row ID | File ID | Name | Body | Modification Date.... |
|--------|---------|------|------|----------------------|
| R1 | X1 | / | | (NULL) |
| R2 | X2 | Windows | | (NULL) |
| R3 | X3 | Word | | (NULL) |
| R4 | X4 | Example.doc | BLOB | |
| R5 | X5 | Access | | (NULL) |
| R6 | X6 | Unix | | (NULL) |
| R7 | X7 | App1 | | (NULL) |
| R8 | X8 | App2 | | (NULL) |
| R9 | X9 | VMS | | (NULL) |
| R10 | X10 | App3 | | (NULL) |
| R11 | X11 | App4 | | (NULL) |
| R12 | X12 | Example.doc | BLOB | |

Fig. 2

DIRECTORY_LINKS TABLE 310

| Parent ID | Child ID | Child_Name |
|---|---|---|
| X1 | X2 | Windows |
| X2 | X3 | Word |
| X3 | X4 | Example.doc |
| X2 | X5 | Access |
| X1 | X6 | Unix |
| X6 | X7 | App1 |
| X6 | X8 | App2 |
| X1 | X9 | VMS |
| X9 | X10 | App3 |
| X9 | X11 | App4 |
| X11 | X12 | Example.doc |

PROCESSING PATH-BASED DATABASE OPERATIONS

RELATED CASES

The present application is related to U.S. Pat. No. 6,427,123, entitled "HIERARCHICAL INDEXING FOR ACCESSING HIERARCHICALLY ORGANIZED INFORMATION IN A RELATIONAL SYSTEM", filed Feb. 18, 1999; U.S. patent application Ser. No. 09/571,696, entitled "VERSIONING IN INTERNET FILE SYSTEM", filed May 15, 2000; U.S. patent application Ser. No. 10/259,176 (now U.S. Pat. No. 7,051,039 B1), entitled "MECHANISM FOR UNIFORM ACCESS CONTROL IN A DATABASE SYSTEM", filed Sep. 27, 2003; U.S. patent application Ser. No. 10/260,381, entitled "MECHANISM TO EFFICIENTLY INDEX STRUCTURED DATA THAT PROVIDES HIERARCHICAL ACCESS IN A RELATIONAL DATABASE SYSTEM", filed Sep. 27, 2002; U.S. patent application Ser. No. 10/306,485 (now U.S. Pat. No. 6,965,903 B1), entitled "TECHNIQUES FOR MANAGING HIERARCHICAL DATA WITH LINK ATTRIBUTES IN A RELATIONAL DATABASE", filed Nov. 26, 2002; U.S. patent application Ser. No. 10/884,311, entitled "INDEX FOR ACCESSING XML DATA", filed Jul. 2, 2004; U.S. patent application Ser. No. 10/944,177, entitled "INDEX MAINTENANCE FOR OPERATIONS INVOLVING INDEXED XML DATA", filed Sep. 16, 2004; U.S. patent application Ser. No. 10/944,170, entitled "EFFICIENT QUERY PROCESSING OF XML DATA USING XML INDEX", filed Sep. 16, 2004; U.S. patent application Ser. No. 10/452,164 (now U.S. Pat. No. 7,203,709 B2), entitled "TRANSACTION-AWARE CACHING FOR ACCESS CONTROL METADATA", filed May 30, 2003; U.S. patent application Ser. No. 10/452,163, entitled "TRANSACTION-AWARE CACHING FOR FOLDER PATH DATA", filed May 30, 2003; and U.S. patent application Ser. No. 09/728,909 (now U.S. Pat. No. 7,058,648 B1), entitled "HIERARCHY-BASED SECURED DOCUMENT REPOSITORY", filed Dec. 1, 2000; the contents of all of which are hereby incorporated by reference in their entirety for all purposes as if fully set forth herein.

FIELD OF THE INVENTION

The present invention relates to databases, and in particular, to processing path-based database operations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Emulating a Hierarchical File System in a Relational Database System

Humans tend to organize information in categories. The categories in which information is organized are themselves typically organized relative to each other in some form of hierarchy. For example, an individual animal belongs to a species, the species belongs to a genus, the genus belongs to a family, the family belongs to an order, and the order belongs to a class.

With the advent of computer systems, techniques for storing electronic information have been developed that largely reflected this human desire for hierarchical organization. Conventional computer file systems, for example, are typically implemented using hierarchy-based organization principles. Specifically, a typical file system has directories arranged in a hierarchy, and documents stored in the directories. Ideally, the hierarchical relationships between the directories reflect some intuitive relationship between the meanings that have been assigned to the directories. Similarly, it is ideal for each document to be stored in a directory based on some intuitive relationship between the contents of the document and the meaning assigned to the directory in which the document is stored.

Figure 1:
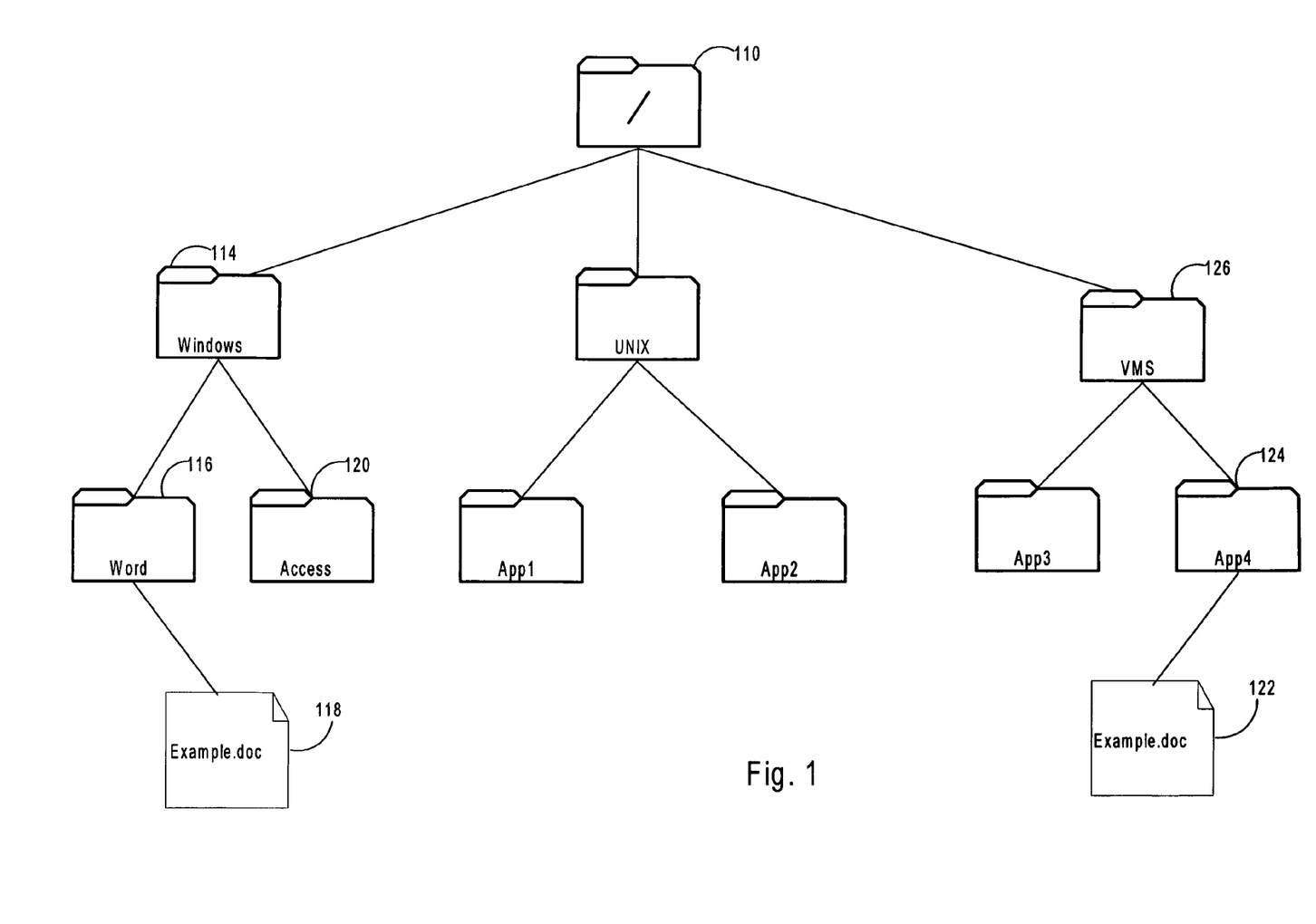
FIG. 1 is a block diagram illustrating a hierarchically organized file system.

FIG. 1 shows an example of a typical file system. The illustrated file system includes numerous directories arranged in a hierarchy. Two documents 118 and 122 are stored in the directories. Specifically, documents 118 and 122, both of which are entitled "Example.doc", are respectively stored in directories 116 and 124, which are respectively entitled "Word" and "App4".

In the directory hierarchy, directory 116 is a child of directory 114 entitled "Windows", and directory 114 is a child of directory 110. Similarly, directory 124 is a child of directory 126 entitled "VMS", and directory 126 is a child of directory 110. Directory 110 is referred to as the "root" directory because it is the directory from which all other directories descend. In many systems, the symbol "/" is used to refer to the root directory. Each of directories 110, 114, 116, 120, 124, 126, and each of documents 118 and 122, is a separate node in the directory hierarchy.

When electronic information is organized in a hierarchy, each item of information may be located by following a "path" through the hierarchy to the entity that contains the item. Within a hierarchical file system, the path to an item begins at the root directory and proceeds down the hierarchy of directories to eventually arrive at the directory that contains the item of interest. For example, the path to file 118 consists of directories 110, 114 and 116, in that order.

Hierarchical storage systems often allow different items to have the same name. For example, in the file system shown in FIG. 1, both of the documents 118 and 122 are entitled "Example.doc". Consequently, to unambiguously identify a given document, more than just the name of the document is required.

A convenient way to identify and locate a specific item of information stored in a hierarchical storage system is through the use of a "pathname". A pathname is a concise way of uniquely identifying an item based on the path through the hierarchy to the item. A pathname is composed of a sequence of names. In the context of a file system, each name in the sequence of names is a "filename". The term "filename" refers to both the names of directories and the names of documents, since both directories and documents are considered to be "files".

Within a file system, the sequence of filenames in a given pathname begins with the name of the root directory, includes the names of all directories along the path from the root directory to the item of interest, and terminates in the name of the item of interest. Typically, the list of directories to traverse is concatenated together, with some kind of separator punctuation (e.g., '/', '\', or ';') to make a pathname. Thus, the pathname for document 118 is /Windows/Word/Example.doc, while the pathname for document 122 is /VMS/App4/Example.doc.

The relationship between directories (files) and their contained content varies significantly between different types of hierarchically organized systems. One model, employed by various implementations, such as Windows and DOS file systems, requires each file to have exactly one parent, forming a tree. In a more complicated model, the hierarchy takes the form of a directed graph, where files can have multiple parents, as in the UNIX file system in which hard links are used. Unix file systems only allow hard links to files (not directories).

In contrast to hierarchical approaches to organizing electronic information, a relational database stores information in tables comprised of rows and columns. Each row is identified by a unique row ID. Each column represents an attribute of a record, and each row represents a particular record. Data is retrieved from the database by submitting queries to a database management system (DBMS) that manages the database.

Each type of storage system has advantages and limitations. A hierarchically organized storage system is simple, intuitive, and easy to implement, and is a standard model used by most application programs. Unfortunately, the simplicity of the hierarchical organization does not provide the support required for complex data retrieval operations. For example, the contents of every directory may have to be inspected to retrieve all documents created on a particular day that have a particular filename. Since all directories must be searched, the hierarchical organization does nothing to facilitate the retrieval process.

A relational database system is well suited for storing large amounts of information and for accessing data in a very flexible manner. Relative to hierarchically organized systems, data that matches even complex search criteria may be easily and efficiently retrieved from a relational database system. However, the process of formulating and submitting queries to a database server is less intuitive than merely traversing a hierarchy of directories, and is beyond the technical comfort level of many computer users.

In the past, hierarchically organized systems and relationally organized systems have been implemented in different ways that were not compatible. With some additional processing, however, a relationally organized system can emulate a hierarchically organized system. This type of emulation is especially desirable when the storage capability and flexibility of a relational system is needed, but the intuitiveness and ubiquity of the hierarchical system is desired.

Such emulation may be implemented through the use of two relational tables: a "file" table and a "directory links" table. The file table stores information relating to each file in the emulated hierarchical system. For files that are documents, the file table further stores either the body of the file (in the form of a large binary object (BLOB)), or a pointer to the body of the document. The directory links table stores all of the link information that indicates the parent-child relationships between files.

To understand how these two tables may be used to emulate a hierarchical storage system, one may suppose that a file system having the hierarchical structure of FIG. 1 is implemented in a database. The file system of FIG. 1 can be illustrated as follows (a unique ID, shown in parentheses, is assigned by the system to uniquely identify each file):

-/ (X1)
   -Windows (X2)
      -Word (X3)
         -Example.doc (X4)
      -Access (X5)

-continued

-Unix (X6)
   -App1 (X7)
   -App2 (X8)
-VMS (X9)
   -App3 (X10)
   -App4 (X11)
      -Example.doc (X12)

Figure 2:
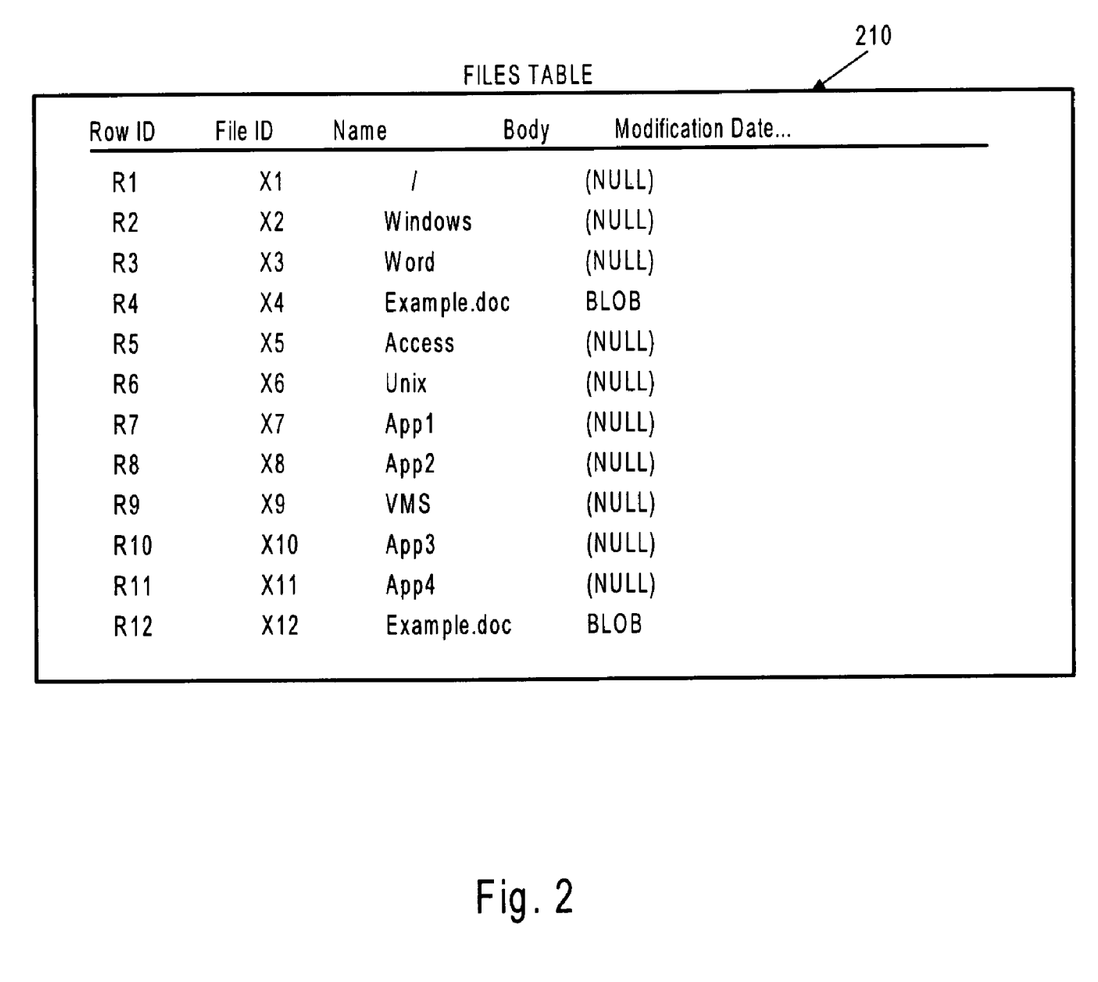
FIG. 2 shows a files table that may be used to emulate a hierarchically organized system in a relationally organized system.
Figure 3:
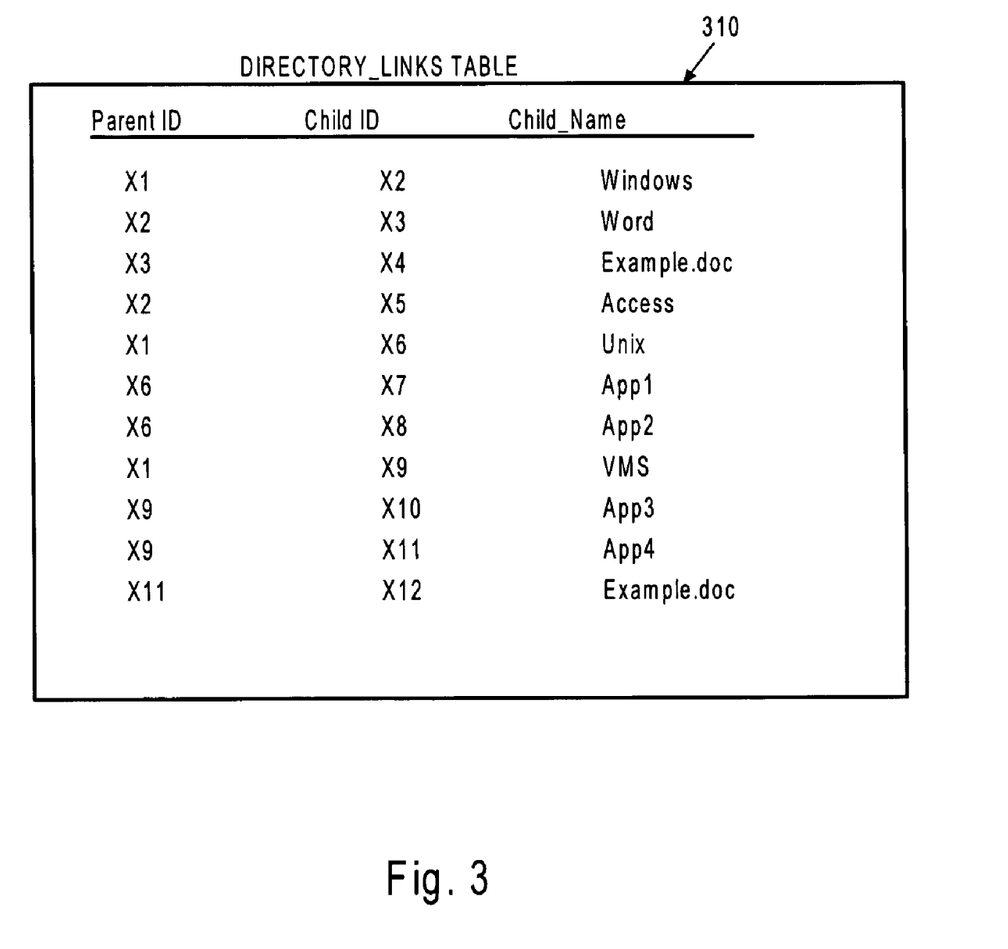
FIG. 3 shows a directory links table that may be used in conjunction with the files table of FIG. 2 to emulate a hierarchically organized system.

FIG. 2 shows a files table 210, and FIG. 3 shows a directory links table 310, which may be used by a computer system to emulate the file system of FIG. 1 in a relational database system. Files table 210 contains an entry for each file in the system. Each entry includes a row ID, a file ID, a name, a body column, and a modification date column (plus other system-maintained information such as creation date, access permission information, etc.).

The file ID, also known as the "object ID" or "OID," is a unique ID assigned to each file by the system. The name is the name assigned to the file, which does not need to be unique. The body is the field in which the contents of a file are stored. The body field may store the actual contents of a file in the form of a binary large object (BLOB), or a pointer to the contents of the file. Where the entry is for a file having no content (e.g. a directory), the body field is null. In the above example, only the two documents entitled Example.doc have content; thus, the body field for all of the other entries is null.

In directory links table 310, an entry is stored for each link between files in the file system of FIG. 1. Each entry includes a parent ID, a child ID, and a child_name field. For each link, the parent ID field specifies the file which is the parent file for the link, the child ID field specifies the file which is the child file for the link, and the child_name field specifies the name of the child file in the link. Thus, for example, in the entry for the link between root directory 110 and Windows directory 114, directory links table 310 specifies that X1 (the FileID of the root directory) is the parent ID, X2 (the FileID of the Windows directory) is the child ID, and "Windows" is the child_name.

To illustrate how the information in these two tables may be used to implement the file system of FIG. 1, one may suppose that it is necessary to access document 118. As explained above, document 118 has the path: /Windows/Word/Example.doc. To access this file, the DBMS makes an initial scan of directory links table 310 to find the entry where root directory 110 is the parent file and Windows directory 114 is the child file. To do this, the DBMS executes something like the following SQL statement:

Select ChildID
      from directory_links
      Where ParentID="X1"
         child_name="Window".

This query returns the ID of the child file, which in this case is X2 (for Windows directory 114). After obtaining the ID of the child file, the DBMS makes a second scan of the directory links table 310, this time looking for the entry where the parent file is Windows directory 114, and the child file is Word directory 116. This is achieved by executing the following Select statement:

Select ChildID
      from directory_links
      Where ParentID="X2" and
      Child_name="Word".

This query returns the ID of Word directory 116, which in this example is X3. With this information, the DBMS makes a third scan of directory links table 310, this time searching for the entry where the parent file is Word directory 116 and the child file is Example.doc document 118. This is achieved with the following Select statement:

Select ChildID
from directory_links
Where ParentID="X3" and
Child_name="Example.doc"

At the end of this process, the ID of document 118 will have been determined. Using this ID as the primary key, the proper entry in files table 210 is located, and the contents of document 118 are accessed from the body field. Thus, using this technique, files that are actually stored in a relational structure, such as table 210, may be located and accessed using pathnames just as if they were stored in a hierarchically organized structure. The user submitting the pathname to locate a file need not understand the complexity of a relational system. Conversely, because the files are stored in a relational system, the files may be efficiently accessed in more sophisticated ways by users that are familiar with relational systems.

Determining Whether a File Exists within a Specified Path

Some operations require a database server to determine whether a particular file exists within a specified path of a file hierarchy. For example, a user of a hierarchical file system implemented as described above might wish to obtain a list of documents that (a) contain a specified keyword and (b) are located within a specified path in the file hierarchy. For example, a user might wish to locate all files that (a) contain the word "Oracle" and (b) are located within the path "/Windows". If both documents 118 and 122 contained the word "Oracle," then the database server would need to determine, for each document, whether that document existed within the path "/Windows".

To start with, the database server might know the file ID for document 118 (i.e., "X4") and the ID for document 122 (i.e., "X12"). The database server may derive the full pathname for each of documents 118 and 122 by following the links indicated in directory links table 310. For example, to derive the pathname for document 118, the database server scans directory links table 310 for a row that indicates a child ID of "X4". Upon locating the row, the database server determines that the Child_Name in the row is "Example.doc," so the database server prepends "Example.doc" to the front of the currently empty and null pathname. The database server also determines that the row indicates a parent ID of "X3."

Consequently, the database server scans directory links table 310 for a row that indicates a child ID of "X3". Upon locating the row, the database server determines that the Child_Name in the row is "Word," so the database server prepends "Word/" to the front of the pathname, making the pathname "Word/Example.doc". The database server also determines that the row indicates a parent ID of "X2".

Consequently, the database server scans directory links table 310 for a row that indicates a child ID of "X2". Upon locating the row, the database server determines that the Child_Name in the row is "Windows," so the database server prepends "Windows/" to the front of the pathname, making the pathname "Windows/Word/Example.doc". The database server also determines that the row indicates a parent ID of "X1".

Knowing that the node corresponding to the "X1" ID is the root directory "/", the database server prepends "/" to the front of the pathname, making the pathname "/Windows/Word/Example.doc". By performing a string comparison, the database server determines that the pathname "/Windows/Word/Example.doc" falls within the specified pathname "/Windows". Consequently, the database server returns document 118 as a result of the operation described above.

Using the same link table-scanning and link-tracing technique discussed above, the database server determines that the complete pathname for document 122 is "/VMS/App4/Example.doc". By performing a string comparison, the database server determines that the pathname "/VMS/App4/Example.doc" does not fall within the specified pathname "/Windows". Consequently, the database server does not return document 122 as a result of the operation described above.

In performing the technique described above, rather than scanning every row of directory links table 310 when searching for a row with a particular child ID, the database server may scan a B-tree index built on the child ID column of directory links table 310. As a result, each scan may be performed in O(log(N)) time rather than O(N) time. Despite this improvement, when there are many entries in directory links table 310, and when the depth of the file hierarchy is significant, determining whether a particular file exists within a specified path of a file hierarchy can be a prohibitively expensive operation in terms of time.

A faster, more efficient way of determining whether a particular file exists within a specified path of a file hierarchy emulated by a database system is needed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus is described for processing path-based database operations. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to one embodiment of the invention, in order to process path-based database operations, such as those described in the foregoing Background section, more efficiently, a "parent row ID" column is added to a directory links table. For each row in the directory links table, the value of the "parent row ID" column indicates the row ID, in the directory links table, of the node that is that row's node's parent in the file hierarchy. Whenever a node is added to the file hierarchy, the row ID of that node's parent is populated in the "parent row ID" column of that node's row. Whenever the parent of a node changes in the file hierarchy, the "parent row ID" column of that node's row is updated to indicate the row ID, in the directory links table, of that node's new parent. If the file system supports links, a resource can have multiple parents in which case an array of all parents is stored in the column "parent row ID."

To determine whether a particular node is within a specified path of the file hierarchy, a database server derives the particular node's pathname by iteratively visiting, in a child-to-parent/bottom-to-top manner, child-parent links indicated in the directory links table and prepending, to the front of a pathname being constructed for the particular node, node names indicated in the visited rows. This is similar to the technique described in the foregoing Background section. However, instead of scanning a B-tree index to locate a directory links table row that contains a parent node's file ID/OID, the database server instantly locates a parent node's row in the directory links table by using the value of the "parent row ID" column of the child node's row. As is discussed above, the value of the "parent row ID" column indicates the storage location, in the directory links table, of the parent node's row. Instantly locating the parent node's row in this manner is significantly faster and more efficient than scanning the directory links table or a B-tree index for the row that contains the parent node's file ID. After the database server has derived the particular node's pathname, the database server compares the particular node's pathname with the specified path to determine whether the particular node exists within the specified path. The cost of locating the parent node's row using the parent row ID is independent of the size of the hierarchy, and therefore performs very well even for very large hierarchies.

Database Architecture

Figure 4:
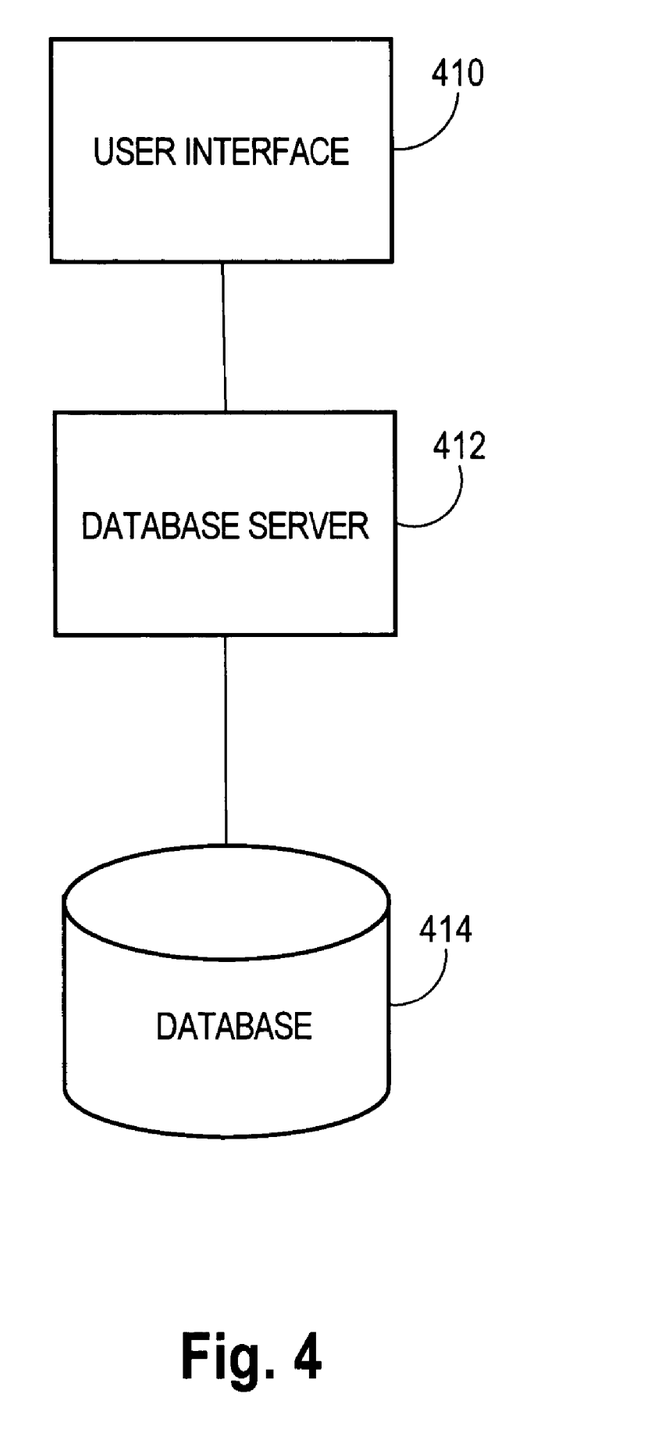
FIG. 4 is a block diagram illustrating a database system that may be used to implement one embodiment of the invention.

FIG. 4 is a block diagram showing a database architecture that may be used to implement an embodiment of the present invention. The architecture comprises a user interface 410, a database server 412, and a database 414. Database server 412 interacts with the user via user interface 410, and accesses and maintains database 414 in accordance with the user input. Database server 412 may also interact with other systems (not shown).

In general, database server 412 creates a database by organizing information in one or more tables. The organization of the table is referred to as a definition. An index is a structure that is used for accessing particular information in the table more quickly. Therefore, a table definition supports any access mechanism to the data (search by name, by ID, by date, etc.), whereas an index is designed for a specific access method. The index itself is generally not the authoritative source of the data, but rather contains pointers to the disk addresses of the tables storing the authoritative data.

Directory Links Table

Table 1 below illustrates an example directory links table that, according to one embodiment of the invention, includes a "parent row ID" column whose values indicate the storage locations of each node's parent's row in the directory links table.

TABLE 1

EXAMPLE DIRECTORY LINKS TABLE

| ROW ID | PARENT OID | CHILD OID | NODE NAME | PARENT ROW ID | ACCESS LEVEL |
|---|---|---|---|---|---|
| R1 | X1 | X2 | Windows | R0 | 3 |
| R2 | X2 | X3 | Word | R1 | 3 |
| R3 | X3 | X4 | Example.doc | R2 | 3 |
| R4 | X2 | X5 | Access | R1 | 4 |
| R5 | X1 | X6 | Unix | R0 | 2 |
| R6 | X6 | X7 | App1 | R5 | 3 |
| R7 | X6 | X8 | App2 | R5 | 2 |
| R8 | X1 | X9 | VMS | R0 | 1 |
| R9 | X9 | X10 | App3 | R8 | 2 |
| R10 | X9 | X11 | App4 | R8 | 2 |
| R11 | X11 | X12 | Example.doc | R10 | 3 |

In order to derive the pathname for document 122 from Table 1, database server 412 initially locates the row whose child OID column indicates the OID that corresponds to document 122. In this example, the row whose child OID column indicates the OID that corresponds to document 122 is the row identified by row ID "R11". Database server 412 prepends row R11's indicated node name, "Example.doc", to the front of the pathname being derived.

Database server 412 determines that row R11's indicated parent row ID is "R10." Because each row in the database links table is stored at a storage location that corresponds to and is immediately ascertainable from that row's row ID, database server 412 directly locates row R10 using the indicated parent row ID. Database server 412 prepends row R10's indicated node name, "App4", and a separator, "/", to the front of the pathname being derived.

Database server 412 determines that row R10's indicated parent row ID is "R8." Database server 412 directly locates row R8 using the indicated parent row ID. Database server 412 prepends row R8's indicated node name, "VMS", and a separator, "/", to the front of the pathname being derived.

Database server 410 determines that row R8's indicated parent row ID is "R0." Database server 412 determines that row R0 corresponds to root directory 110. Therefore, database server 412 prepends a separator, "/", to the front of the pathname being derived. Thus, the full pathname for document 122 is "/VMS/App4/Example.doc". By comparing the string "/VMS/App4/Example.doc" to the string "/Windows", database server 410 determines that document 122 is not within the path "/Windows".

While in one embodiment, the parent row ID column is contained in the directory links table as described above, in an alternative embodiment, the parent row ID column is contained in a table that is separate from the directory links table.

Symbolic Links

In one embodiment, a file hierarchy may contain symbolic links to nodes. A symbolic link is a pointer or reference to a node. A symbolic link may occur at a different location in the file hierarchy than the node and may have a different name than the node. For example, a symbolic link created as a child of directory 120 may refer to document 122. For another example, a symbolic link created as a child of directory 126 may refer to directory 116. Accessing such a symbolic link is equivalent to accessing the target node to which the symbolic link refers. If a symbolic link to document 122 was created as a child of directory 120, then document 122 would appear to be a child of directory 120 as well as a child of directory 124. If a symbolic link to directory 116 was created as a child of directory 126, then directory 116 would appear to be a child of directory 126 as well as a child of directory 114.

Because such symbolic links may exist in a file hierarchy, the parent ID column may contain multiple values for certain rows in the directory links table. In one embodiment, multiple values may exist in the parent row ID column of rows that correspond to directory nodes, but only one value may exist in the parent row ID column of rows that correspond to non-directory nodes. This is because, in one embodiment, when a symbolic link to a non-directory node (e.g., document 118 or document 122) is created, a new row for the symbolic link is added to the directory links table; symbolic links to non-directory nodes are stored as separate nodes in the directory links table, but symbolic links to directory nodes are not.

When a symbolic link to a target directory node is created in the file hierarchy, the row ID of the symbolic link's parent node is placed into the parent ID column of the target directory node's row in the directory links table, along with any other values already existing in that column. When a symbolic link to a target directory node is removed from the file hierarchy, the row ID of the symbolic link's parent node is removed from the parent ID column of the target directory node's row in the directory links table.

For example, if a symbolic link to directory 116 was created as a child of directory 126, then the row ID of directory 126 (i.e., "R8") would be added to the parent row ID column of the row for directory 116 (i.e., the row with row ID "R2"). As a result, the parent row ID column in the row with row ID "R2" would contain two values: "R1" and "R8". If this symbolic link was later removed, then the row ID "R8" would be removed from the parent row ID column of the row with row ID "R2," leaving the value "R1" in the parent row ID column of that row.

When an operation is performed to determine whether a particular node is within a specified path of a file hierarchy, multiple values may be encountered in a parent row ID column. When this occurs, the operation divides, and separate paths to the root node are constructed following each of the parent nodes whose row IDs are encountered in the parent row ID column. Thus, multiple different paths may be constructed for a particular node. If the particular node exists within the specified path by virtue of the particular node's existence within any of the constructed paths, then the particular node is considered to exist within the specified path.

Security Access Levels

According to one embodiment, the directory links table also includes a column that indicates the security access level that a user or other entity needs to possess in order to access a particular node. In Table 1 above, this column is labeled "access level." In one embodiment, whenever database server 412 accesses a row of the database links table, database server 412 determines whether a particular user's (typically, the user that is executing the path-based query) security level is at least as high as the value indicates in that row's "access level" column. If database server 412 determines that the particular user's access level is not at least as high as the value indicate in the "access level" column, then database server 412 generates an indication that the particular user is not allowed to determine whether the specified node is within the specified path.

Path Caching

In one embodiment, whenever database server 412 derives a full pathname, database server 412 stores that pathname in a cache. For example, a pathname may be indicated, in the cache, by the OID of the resource; the pathname for "/VMS/App4/Example.doc" may be represented in the cache as "X12", for example.

According to one embodiment, in the course of deriving a pathname from the database links table, database server 412 determines whether the node whose name was most recently prepended to the pathname is already indicated in the cache. If that node is already indicated in the cache, then database server 412 ceases traversing the database links table and finishes deriving the pathname by prepending, to the front of the pathname, a string that corresponds to the remainder of the path as indicated in the cache.

For example, if database server 412 is deriving the pathname for document 122 and database server 412 determines, upon accessing node X11's row in the directory links table, that "X11" is already contained in the cache, then database server prepends, to the currently derived pathname of "Example.doc", the string "/VMS/App4", which corresponds to the cached path "X11." Thus, if a part of a pathname has been derived before, then the pathname may be derived without determining every link in the corresponding path.

Example Technique for Determining Whether a File Exists within a Specified Path

Figure 5A:
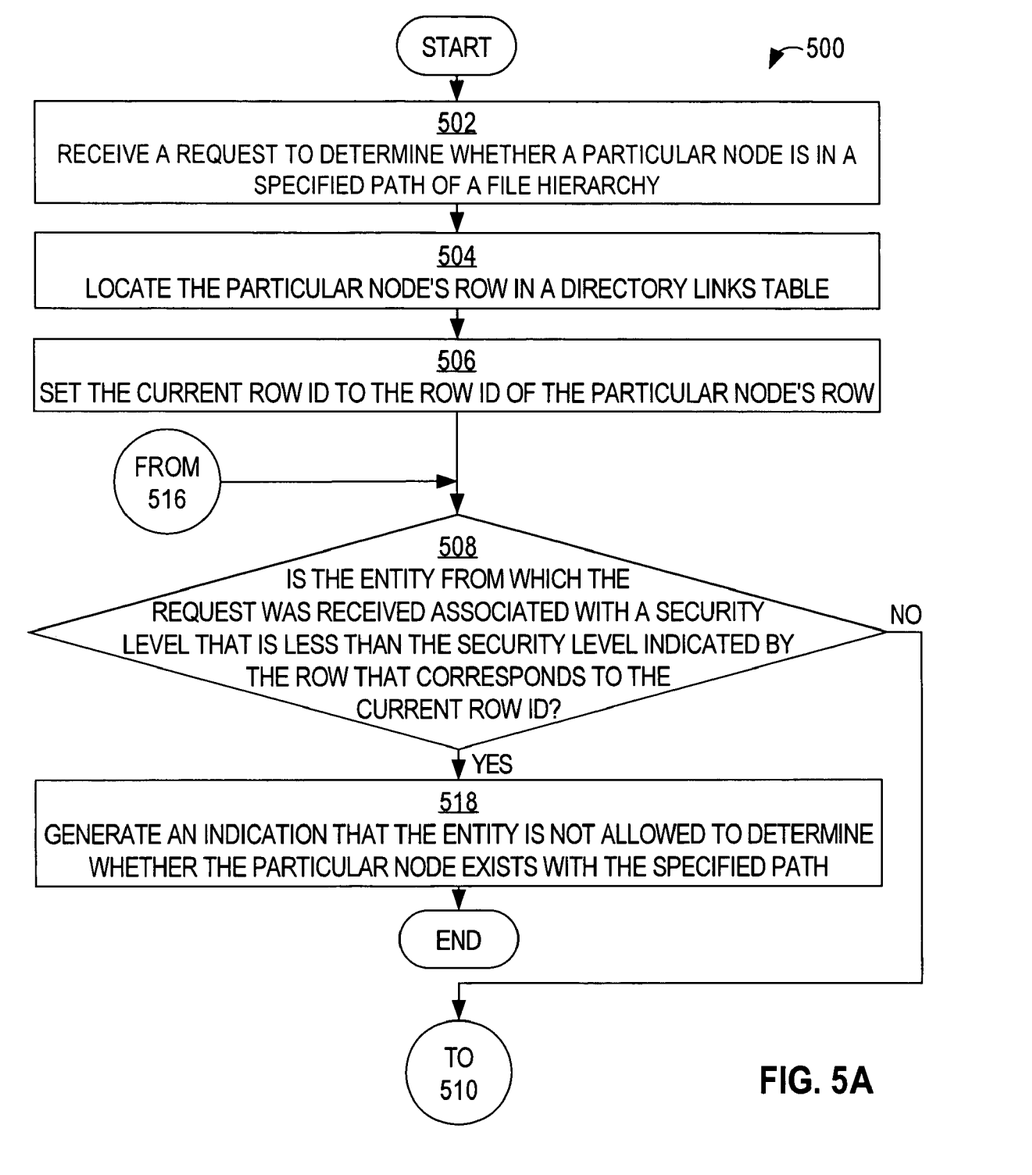
FIGS. 5A-B show a flow diagram illustrating a technique, according to an embodiment of the invention, for determining whether a node exists within a specified path.
Figure 5B:
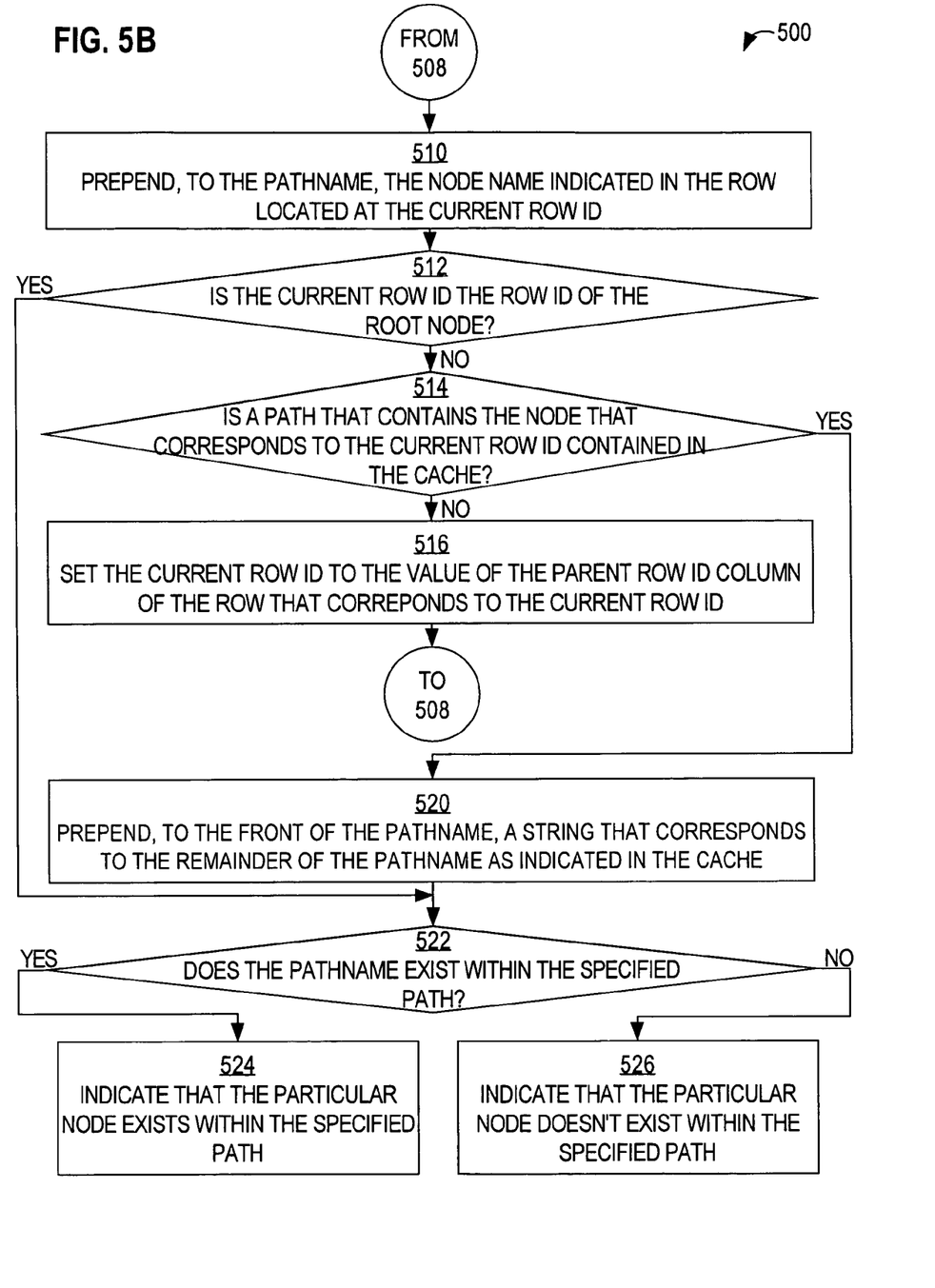

FIGS. 5A-B show a flow diagram illustrating a technique 500, according to an embodiment of the invention, for determining whether a node exists within a specified path. Database server 412 may perform technique 500, for example.

Referring to FIG. 5A, in block 502, a request to determine whether a particular node is in a specified path of a file hierarchy is received. In block 504, the particular node's row in a directory links table is located. In block 506, the current row ID is set to be the row ID of the particular node's row.

In block 508, it is determined whether the entity from which the request was received is associated with a security level that is less than the security level that is indicated by the row that corresponds to the current row ID. If the entity is associated with a security level that is less than the security level that is indicated by the row, then control passes to block 518. Otherwise, control passes to block 510 of FIG. 5B.

Referring to FIG. 5B, in block 510, the node name indicated in the row located at the current row ID is prepended to the front of the pathname being constructed for the particular node. In block 512, it is determined whether the current row ID is the row ID of the root node. If the current row ID is the row ID of the root node, then control passes to block 522. Otherwise control passes to block 514.

In block 514, it is determined whether a path that contains the node that corresponds to the current row ID is contained in the cache. If such a path is contained in the cache, then control passes to block 520. Otherwise, control passes to block 516.

In block 516, the current row ID is set to the value that is indicated in the parent row ID column of the database links table row that corresponds to the current row ID. Control passes back to block 508.

Alternatively, referring to FIG. 5A, in block 518, an indication that the entity is not allowed to determine whether the particular node is within the specified path is generated. Under these circumstances, the current execution of technique 500 ends.

Alternatively, referring to FIG. 5B, in block 520, a string that corresponds to the remainder of the pathname, as indicated in the cache, is prepended to the front of the pathname being constructed for the particular node. Control passes to block 522.

In block 522, it is determined whether the pathname constructed for the particular node exists within the specified path. If the complete specified path occurs as a substring at the beginning of the constructed pathname, then the pathname constructed for the particular node exists within the specified path. If the pathname constructed for the particular node exists with the specified path, then control passes to block 524. Otherwise, control passes to block 526.

In block 524, an indication that the particular node exists within the specified path is generated. Under these circumstances, the execution of technique 500 ends.

Alternatively, in block 526, an indication that the particular node does not exist within the specified path is generated. Under these circumstances, the execution of technique 500 ends.

Hardware Overview

Figure 6:
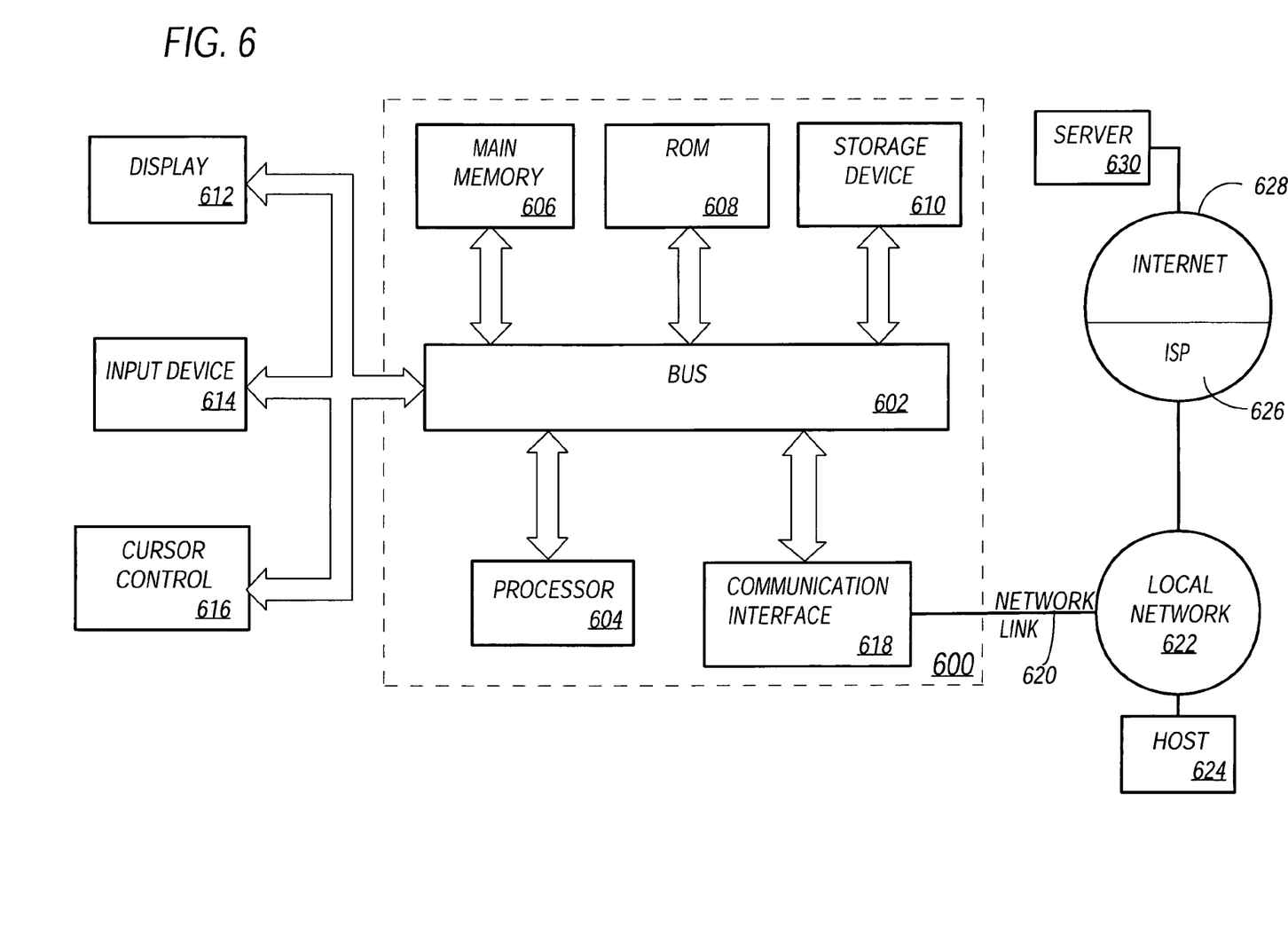
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of processing path-based database operations, the method comprising:
   locating a first database table row containing an identifier in a database column for a first directory node in a hierarchy, wherein the first database table row is located at a storage location indicated by a first row identifier, and wherein the first database table row contains a second row identifier that indicates a storage location of a second database table row, wherein the second database table row contains a different identifier in said database column for a second directory node that is a parent of the first directory node in the hierarchy; and
   prepending, to the front of a path name that is being formed, a node name that is indicated in the second database table row;
   wherein the steps of locating and prepending are performed by a computing device.

2. The method of claim 1, wherein the second database table row includes a third row identifier that indicates a storage location of a third database table row, wherein the third database table row contains an identifier for a third directory node that is a parent of the second directory node in the hierarchy.

3. The method of claim 2, further comprising:
   prepending, to the front of the path name, a node name that is indicated in the third database table row.

4. The method of claim 1, further comprising:
   determining, based on the path name, whether the first directory node is in a specified path of the hierarchy.

5. The method of claim 1, wherein locating the first database table row is performed in response to receiving a request to determine whether the first directory node is in a specified path of the hierarchy.

6. The method of claim 5, further comprising:
   determining whether an entity from which the request was received is associated with a security level that is less than a security level that is indicated by the second database table row; and
   in response to a determination that the entity from which the request was received is associated with a security level that is less than the security level that is indicated by the second database table row, generating an indication that the entity is not allowed to determine whether the first directory node is in the specified path.

7. The method of claim 1, further comprising:
   determining whether a path that contains the second directory node is contained in a cache; and
   in response to a determination that the path is contained in the cache, prepending, to the front of the path name, a string that corresponds to the path.

8. A volatile or non-volatile computer-readable storage medium carrying one or more sequences of instructions which, when executed by one or more processors, causes the one or more processors to perform steps comprising:
   locating a first database table row containing an identifier in a database column for a first directory node in a hierarchy, wherein the first database table row is located at a storage location indicated by a first row identifier, and wherein the first database table row contains a second row identifier that indicates a storage location of a second database table row, wherein the second database table row contains a different identifier in said database column for a second directory node that is a parent of the first directory node in the hierarchy; and
   prepending, to the front of a path name that is being formed, a node name that is indicated in the second database table row.

9. The volatile or non-volatile computer-readable storage medium of claim 8, wherein the second database table row includes a third row identifier that indicates a storage location of a third database table row, wherein the third database table row contains an identifier for a third directory node that is a parent of the second directory node in the hierarchy.

10. The volatile or non-volatile computer-readable storage medium of claim 9, further comprising prepending, to the front of the path name, a node name that is indicated in the third database table row.

11. The volatile or non-volatile computer-readable storage medium of claim 8, further comprising determining, based on the path name, whether the first directory node is in a specified path of the hierarchy.

12. The volatile or non-volatile computer-readable storage medium of claim 8, wherein locating the first database table row is performed in response to receiving a request to determine whether the first directory node is in a specified path of the hierarchy.

13. The volatile or non-volatile computer-readable storage medium of claim 12, further comprising:
   determining whether an entity from which the request was received is associated with a security level that is less than a security level that is indicated by the second database table row; and
   in response to a determination that the entity from which the request was received is associated with a security level that is less than the security level that is indicated by the second database table row, generating an indication that the entity is not allowed to determine whether the first directory node is in the specified path.

14. The volatile or non-volatile computer-readable storage medium of claim 8, further comprising: determining whether a path that contains the second directory node is contained in a cache; and
   in response to a determination that the path is contained in the cache, prepending, to the front of the path name, a string that corresponds to the path.

15. The method of claim 1, wherein the first database table row and the second database table row are both contained in a particular relational database table, wherein the particular relational database table contains a parent row identifier column, and wherein, for each particular database table row of a plurality of rows in the particular relational database table, the particular database table row contains, in a cell of the parent row identifier column, a row identifier of a parent directory node of a directory node whose node name is indicated in the particular database table row.

16. The volatile or non-volatile computer-readable storage medium of claim 8, wherein the first database table row and the second database table row are both contained in a particular relational database table, wherein the particular relational database table contains a parent row identifier column, and wherein, for each particular database table row of a plurality of rows in the particular relational database table, the particular database table row contains, in a cell of the parent row identifier column, a row identifier of a parent directory node of a directory node whose node name is indicated in the particular database table row.

17. The method of claim 1, wherein the first database table row contains a value in a cell in a node name column that indicates a node name of the first directory node; and wherein the second database table row contains a value in a cell in the node name column that indicates a node name of the second directory node.

18. The volatile or non-volatile computer-readable storage medium of claim 8, wherein the first database table row contains a value in a cell in a node name column that indicates a node name of the first directory node; and wherein the second database table row contains a value in a cell in the node name column that indicates a node name of the second directory node.

* * * * *

UNITED STATES PATENT AND TRADEMARK OFFICE
CERTIFICATE OF CORRECTION

PATENT NO. : 7,627,547 B2 Page 1 of 1
APPLICATION NO. : 10/999864
DATED : December 1, 2009
INVENTOR(S) : Namit Jain et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 422 days.

On page 3, in column 2, under "Other Publications", line 18, delete "MacMillian" and insert -- MacMillan --, therefor.

On sheet 6 of 7, in Figure 5B, Box 516, line 2, delete "CORREPONDS" and insert -- CORRESPONDS --, therefor.

Signed and Sealed this

Fourteenth Day of September, 2010

David J. Kappos
*Director of the United States Patent and Trademark Office*